United States Patent [19]

Reese

[11] Patent Number: 4,864,243

[45] Date of Patent: Sep. 5, 1989

[54] METHOD AND AN APPARATUS FOR RESOLVING IDENTICAL ADDRESS REQUESTS IN A DUAL PORT CIRCUIT DEVICE

[75] Inventor: Edmund A. Reese, Portland, Oreg.

[73] Assignee: VLSI Technology, Inc., San Jose, Calif.

[21] Appl. No.: 129,648

[22] Filed: Dec. 7, 1987

[51] Int. Cl.[4] .......................... H03K 17/28; H03K 5/26
[52] U.S. Cl. .................................... 328/110; 307/518; 307/470; 307/514
[58] Field of Search ............... 307/291, 289, 443, 290, 307/470, 471, 468, 578, 445, 247.1; 328/110, 109, 120; 365/189, 230

[56] References Cited

U.S. PATENT DOCUMENTS

| | | | |
|---|---|---|---|
| 4,282,489 | 8/1981 | DeRienzo | 307/360 |
| 4,502,014 | 2/1985 | Bismarck | 307/470 |
| 4,620,118 | 10/1986 | Barber | 307/518 |

Primary Examiner—Stanley D. Miller
Assistant Examiner—Timothy P. Callahan
Attorney, Agent, or Firm—Limbach, Limbach & Sutton

[57] ABSTRACT

An improvement to an arbitration circuit in a dual port memory circuit device is disclosed. The arbitration circuit resolves near simultaneous identical address requests on the two ports. The arbitration circuit has a first state where the identical address request is resolved by permitting address requests to the first address port and denying writing of data to the second port and a second state where the identical address request is resolved by permitting address requests to the second address port and denying writing of data to the first port. The arbitration circuit also has a meta-state where the arbitration circuit is unable to resolve the identical address request. The improvement of the present invention detects the arbitration circuit in the meta-state and forcing the arbitration circuit into the first state in response to the detection of the meta-state.

11 Claims, 6 Drawing Sheets

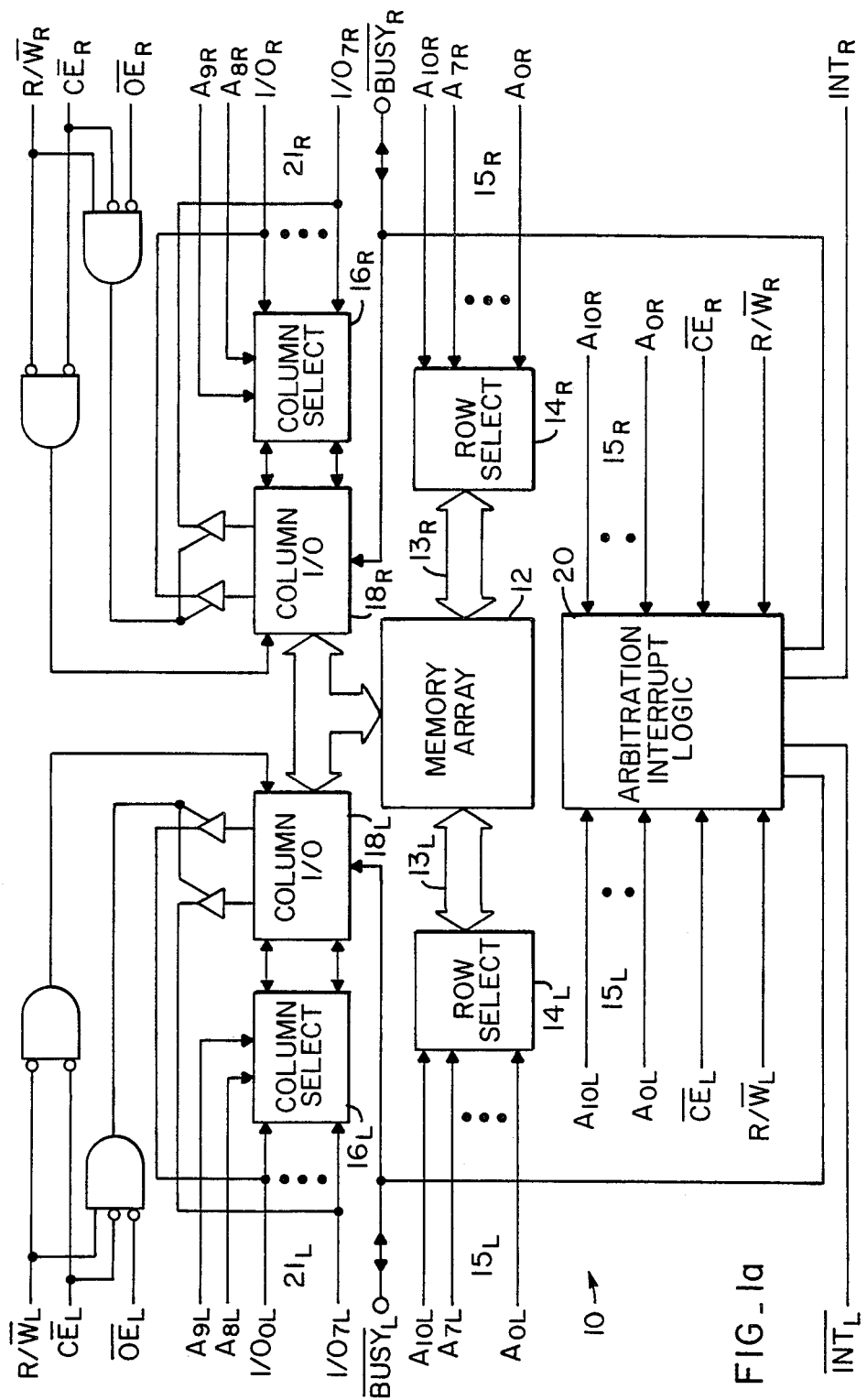
FIG_1a

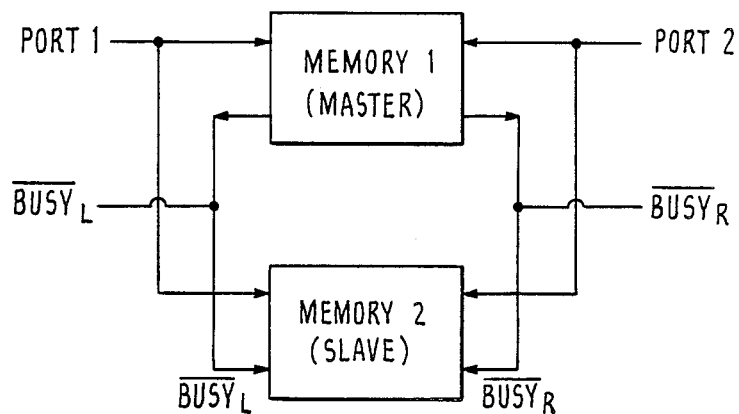
FIG._1b
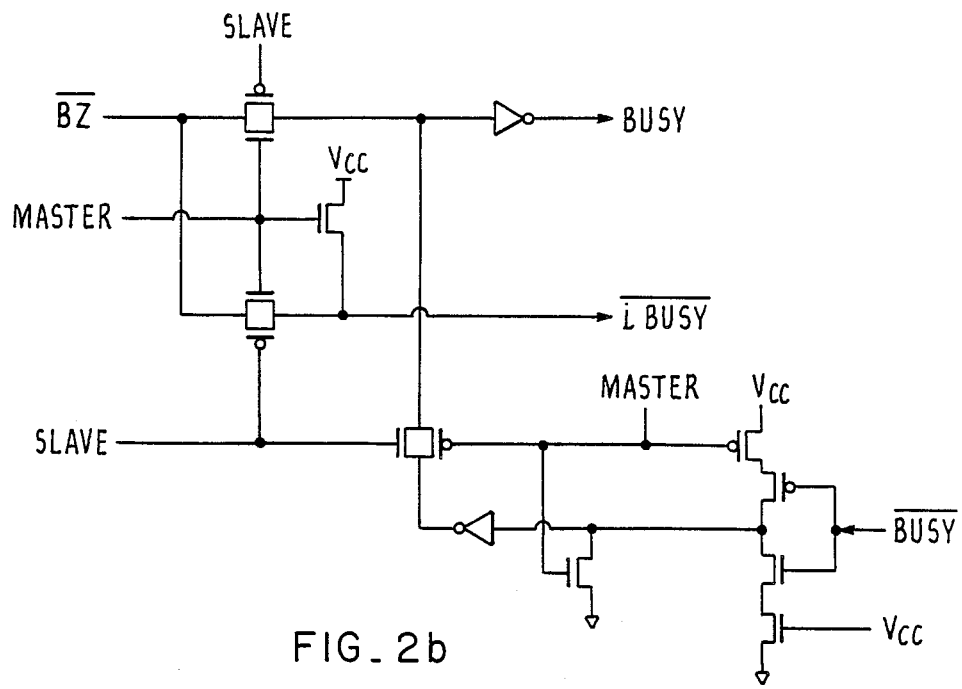
FIG._2b

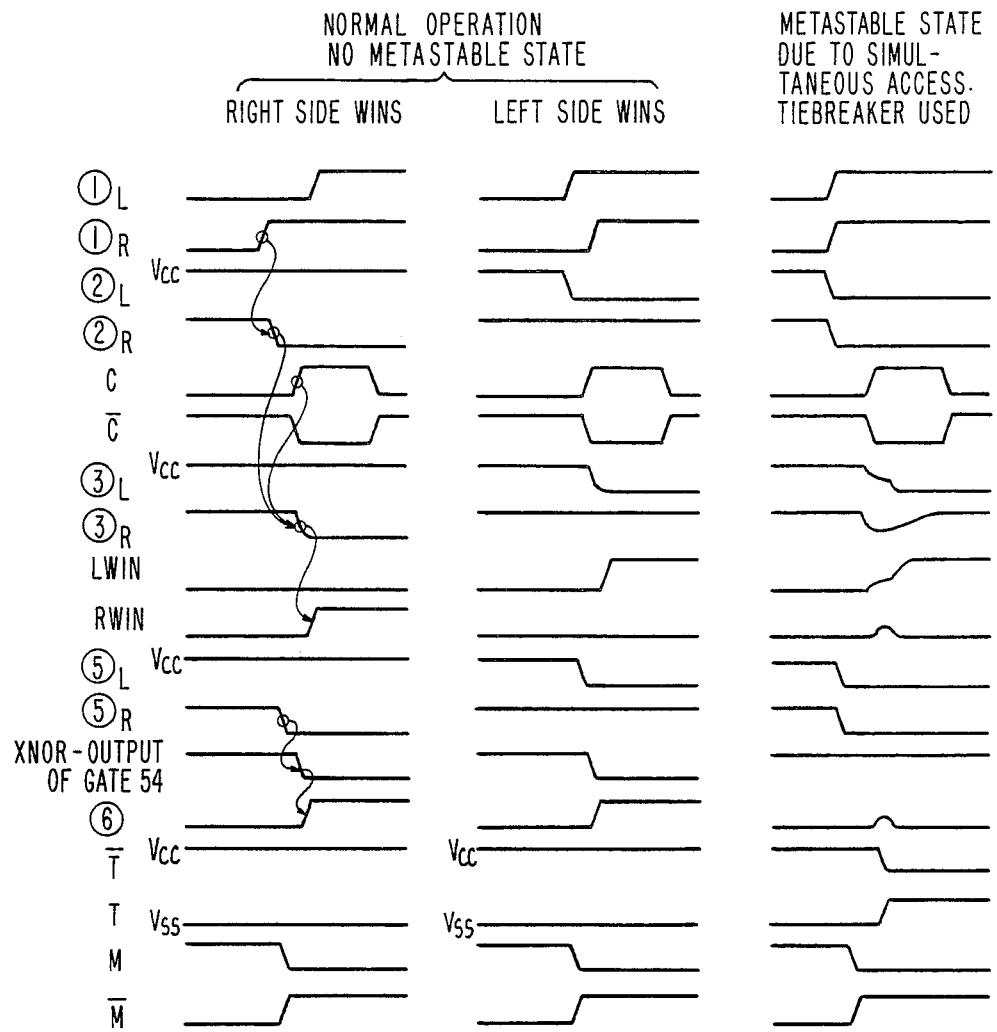

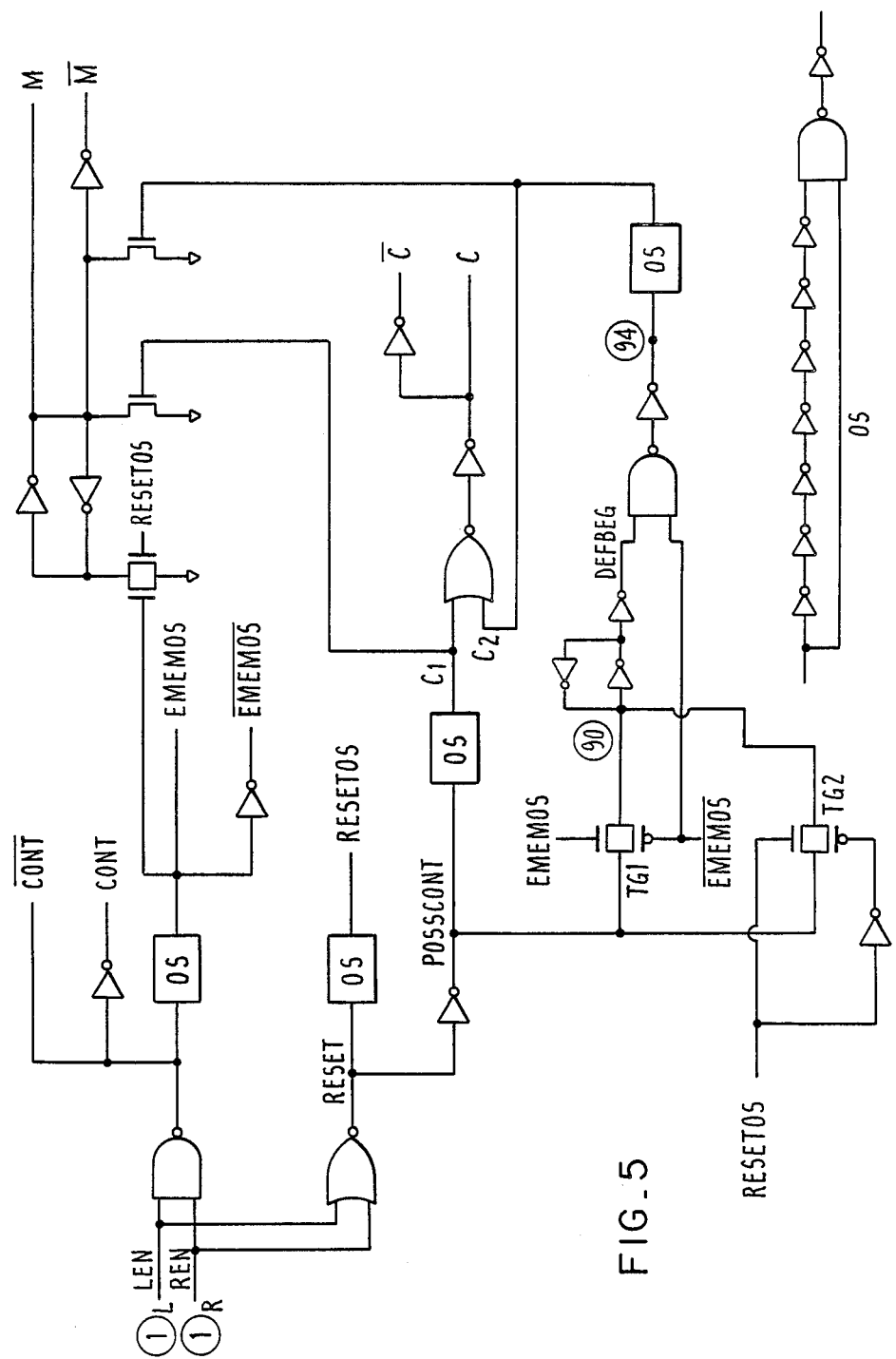
FIG_5

METHOD AND AN APPARATUS FOR RESOLVING IDENTICAL ADDRESS REQUESTS IN A DUAL PORT CIRCUIT DEVICE

TECHNICAL FIELD

The present invention relates to a method and an apparatus for resolving identical address requests in a dual port circuit device having an arbitration circuit means, but with said arbitration circuit means having a meta-state wherein said arbitration means is unable to resolve identical address requests to the dual ports.

BACKGROUND OF THE INVENTION

Dual port memory circuit devices are well known in the art. Typically, the dual port memory is a random access memory having two address and data ports wherein two requests to the memory can be handled at the same time. Such a dual port memory or DPRAM is often made from an array of arrays of static RAM's or SRAM with attending logic control circuits. The DPRAM facilitates communication between parts of the system that are either incompatible in some way or that need to be kept busy on separate buses.

While DPRAM's can handle simultaneous address requests submitted on both of its address ports, the importance of data integrity requires the DPRAM not process write requests to identical addresses in the same memory cycle.

In one form of DPRAM of the prior art, the avoidance of identical address requests in the same memory cycle on the two address ports is left up to the user. Typically, this is accomplished by software programming. This leaves a problem of identical address requests potentially unresolved if the user forgets or incorrectly programs the system.

In an effort to obviate the need for the user to remedy this condition, hardware circuits have been developed and incorporated into the DPRAM chip to arbitrate and resolve identical address requests in the same memory cycle or the two ports. Typically, an arbitration circuit is in the form of a flip flop or cross-coupled NAND gates.

Another prior art hardware technique to resolve identical address requests in the same memory cycle to the two ports is to set up a selected-unselected relationship between the two ports. Thus, identical address requests in the same memory cycle to the two ports would result in the port designated the selected having preference over the port that is designated as the unselected. A variation of the selected-unselected technique is the fabrication of imbalanced transistors in the arbitration circuit such that one side would switch faster than the other, thereby resolving identical requests in the same memory cycle.

Although arbitration circuits of the prior art are able to resolve identical address requests in the same memory cycle to the two ports under nearly all circumstances, it is possible under certain circumstances that the arbitration circuits would be unable to resolve identical address requests. In particular, if the two address requests are simultaneously supplied to the arbitration circuit, the arbitration circuit will enter into a meta-state wherein it is unable to resolve the identical address request in the time when a selected-unselected result is needed.

Similarly, in the case of a selected-unselected circuit, if an address request to the selected port precedes the identical address request to the unselected port wherein the time delay between the two requests equals the time delay in the selected-unselected relationship, then the selected-unselected circuit would be unable to resolve the two identical address requests. In this situation, similar to the arbitration circuit, the selected-unselected circuit enters into a meta-state.

SUMMARY OF THE INVENTION

In the present invention, an improvement to a dual port circuit device is disclosed. The dual port circuit device has a first address port for receiving a first address and a second address port for receiving a second address and an arbitration circuit means for arbitrating identical address requests to the first port and the second port. The arbitration circuit means has two states: a first state and a second state. In the first state, identical address requests is resolved in favor of the first port. In the second state, the second port is favored. The arbitration circuit means also has a meta-state wherein it is unable to resolve the identical address request to the two ports. The improvement to the circuit device comprises means for detecting the arbitration circuit means in said meta-state and means for forcing the arbitration circuit means into the first state in response to the detection of the meta-state.

BRIEF DESCRIPTION OF THE DRAWINGS

FIG. 1a is a schematic block diagram of a dual port memory circuit device incorporating the circuit of the present invention.

FIG. 1b is a block diagram of two dual port memory circuit devices incorporating the circuit of the present invention wherein one is a master and the other is a slave.

FIG. 2b is a detailed logic circuit diagram of a portion of the circuit diagram of FIG. 2a.

FIG. 3(a-b) are various timing diagrams of the operation of the circuit shown in FIG. 2 of non-simultaneous identical address requests, in the same memory cycle, to the first port and to the second port, and wherein the arbitration circuit means resolves the requests by entering into either the first state or the second state.

FIG. 4 are timing diagrams of various portions of the circuit shown in FIG. 2 wherein the arbitration circuit means is in the meta-state with the improvement of the present invention resolving the requests.

FIG. 5 is a detailed logic circuit diagram of a clock circuit used to precharge and to clock the arbitration circuit means.

DETAILED DESCRIPTION OF THE DRAWINGS

Figure 2A:
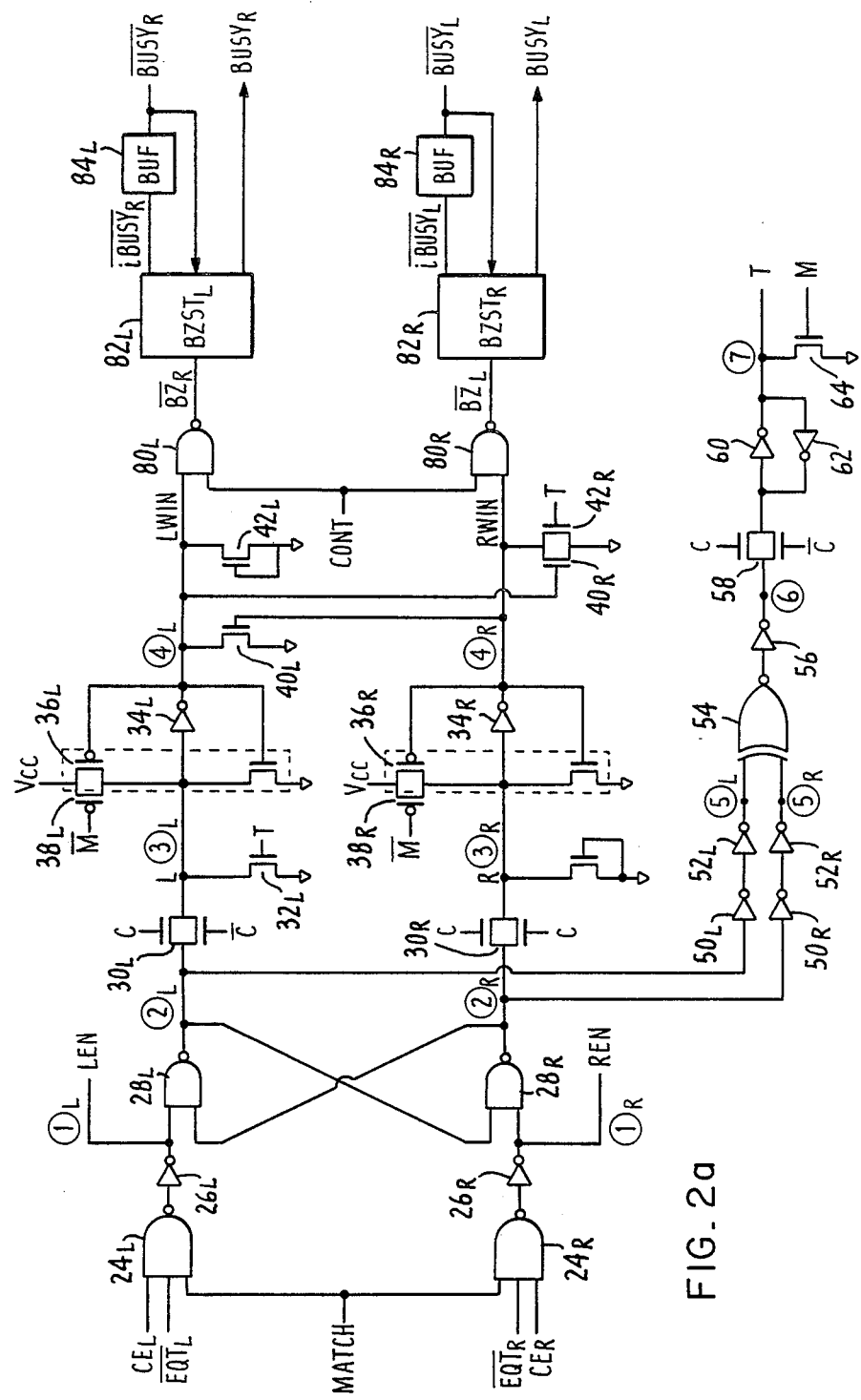
FIG. 2a is a detailed logic circuit diagram of the arbitration circuit means with the present invention, which is a portion of the dual port memory circuit shown in FIG. 1.

Referring to FIG. 1, there is shown a schematic block diagram of a dual port memory circuit 10 incorporating the improvement of the present invention. The dual port memory circuit 10 comprises a memory array 12 having a first address port $13_R$ and a second address port $13_L$. A plurality of first address 15R are supplied to a first row select 14R which supplies the row address along the first address port $13_R$ to the memory array 12. Addresses $A_{8R}$ and $A_{9R}$, a portion of the plurality of first addresses $15_R$, are also supplied to a first column select $16_R$ which controls the first column I/O $18_R$. Finally, the plurality of first addresses of $15_R$ are also supplied to an arbitration interrupt logic unit 20. Other logic circuits to control the address and read/write state of the memory array 12 are also shown in FIG. 1.

The memory array 12, as previously stated is a dual port memory and thus all of the previously described logic elements controlling the first address port $13_R$ are mirrored and are replicated on the other side of the memory array 12 and are designated as the second address port $13_L$, second addresses $15_L$, second row select $14_L$, second column selected $16_L$ and second column I/O $18_L$. The memory array 12 can be comprised of an array of dual ported Static RAM (SRAM) cells.

In the operation of the dual port memory circuit device 10, the memory array 12 receives a first address $15_R$ through the first address port $13_R$, via the first row select $14_R$. The memory array 12 also receives a second address $15_L$ through the second address port $13_L$ via the second row select $14_L$. In the event the first addresses $15_R$ are identical to the second addresses $15_L$, in the same memory cycle, the arbitration interrupt logic circuit 20 would resolve these identical address requests.

If the first addresses $15_R$ precede the second addresses $15_L$ in a write cycle, but with the addresses being identical and within the same memory cycle, the arbitration interrupt logic circuit 20 would enable writing through the first I/O port $21_R$ by enabling the signal line $\overline{BUSY_L}$ and disabling the line designated as $\overline{BUSY_R}$. The enabling of $\overline{BUSY_L}$ would cause the column I/O $18_L$ to be disabled thereby preventing the portion $A_{8L}$ & $A_{9L}$ of the second addresses $15_L$ from addressing the memory array 12, and denying writing of data to the memory array 12 from the second I/O port $21_L$.

Conversely, if the second addresses $15_L$ precede the first addresses $15_R$, the arbitration interrupt logic circuit 20 would enable the second I/O port $21_L$ by enabling the signal line $\overline{BUSY_R}$ and disabling the line designated as $\overline{BUSY_L}$, and denying writing of data to the memory array I2 from the first I/O port $21_R$.

The arbitration circuit is active during both read and write cycles. However, write access is disabled to the port which lost the arbitration conflict in a write cycle only. During a read cycle, even when both ports address the same memory location, the same data is provided to both ports.

Thus, the arbitration interrupt circuit 20 can take on one of two states: a first state where the identical address request in the same memory write cycle is resolved by permitting address request to the first address port $13_R$ and denying writing of data through the second I/O port $21_L$, and a second state where the identical address request in the same memory cycle is resolved by permitting the address request to the second address port $13_L$ and denying writing of data through the first I/O port $21_R$.

The improved arbitration interrupt logic circuit 20 of the present invention is shown in FIG. 2. The designation shown in FIG. 2 of the various signals have the following description:

| Signal | Description |
| --- | --- |
| $CE_L$ | Chip enable on the left port. $CE_L$ equals 1 when the external chip enable input for the left port is active. |
| $CE_R$ | Chip enable on the right port. $CE_R$ equals 1 when the external chip enable input for the right port is active. |
| $\overline{EQT_L}$ | is high when addresses and chip enable on the left port are stable i.e. not changing. The signal goes low during an address or chip enable transition. |
| $\overline{EQT_R}$ | is the same as $\overline{EQT_L}$ but for the right port. The signal indicates addresses and chip enable are stable for the right port. |
| M | This signal goes active high at the end of a memory cycle. It is used to reset the signal T to low in case T had been driven high. The signal also drives the input of the $\overline{M}$ inverter, which is shown in FIG. 5. |
| $\overline{M}$ | This signal is active low at the end of a memory cycle. It goes to the gate of two P channel devices which are used to set nodes $3_L$ and $3_R$ high before the next clocked arbitration event, i.e. when the clock C rises and $\overline{Clock}$ or $\overline{C}$ falls. This precharging resets both LWIN and RWIN signals. |
| RWIN | This indicates the right port wins in an arbitration event, when it goes active high. It is normally low. |
| LWIN | This signal indicates left port wins. |
| T | This signal indicates neither the left nor the right port won an arbitration event by the time the clocks, C and $\overline{C}$ were enabled. Thus, both ports requested access at the same time. |
| C | This is the clock input which enables the first stage of the arbitration circuit drive to drive the next stage, when it goes from a low to a high voltage. This is a one shot signal. |
| $\overline{C}$ | This signal is the inverse clock signal and is used to gate the P channel device of the transmission gates $30_L$ and $30_R$. It is also a one shot signal. |
| Match | This signal indicates when the addresses on the left port are all identical to the addresses on the right port. Match equal 1 when all addresses on the left port are equal to all corresponding addresses on the right port and Match equal 0 otherwise. |

The arbitration interrupt logic circuit 20 with the improvement of the present invention, comprises a first NAND gate $24_R$ which receives the signals: Match, $\overline{EQT_R}$, and $CE_R$. The output of the first NAND gate $24_R$ is inverted by the first inverter $26_R$ and is the signal present at node IR. The arbitration interrupt logic circuit 20 also comprises a second NAND gate $24_L$ for receiving the signals $CE_L$, $\overline{EQT_L}$ and Match. The output of the second NAND gate $24_L$ is also inverted by a second inverter $26_L$ and is present at the node $1_L$. The signals at the nodes $1_L$ and $1_R$ are supplied to two cross coupled NAND gates $28_R$ and $28_L$ with the outputs present on the nodes designated as $2_L$ and $2_R$. From the nodes $2_L$ and $2_R$, the signals are sent to the transmission gates $30_L$ and $30_R$ respectively and are present at the nodes $3_L$ and $3_R$ respectively.

From the nodes $3_L$ and $3_R$, the signals are supplied to the inverters $34_L$ and $34_R$ respectively and are present at the nodes $4_L$ and $4_R$ respectively which are supplied as the signal lines LWIN and RWIN respectively.

From the nodes $2_L$ and $2_R$, the signals are also supplied to third inverters $50_L$ and $50_R$ respectively which are then re-inverted by the fourth inverters $52_L$ and $52_R$ respectively. The signals are then present at the nodes $5_L$ and $5_R$ respectively.

The signals at the nodes $5_L$ and $5_R$ are supplied to an exclusive NOR gate 54 whose output is inverted by an inverter 56 and is present at node 6. The signal at node 6 is supplied to the transmission gate 58 and is inverted by the inverter 60 and is present at node 7. This is the signal T.

In the operation of the arbitration interrupt logic circuit 20 of the present invention, the signals at the nodes $1_L$ and $1_R$ respectively are normally low. This assumes that a Match has not occurred and that the memory array 12 is being responsive to different address requests supplied on the first and second address ports $13_R$ and $13_L$ respectively, in the same memory cycle.

If identical address requests are present on the first addresses $15_R$ and second addresses $15_L$, Match would be high. However, if one of the address requests precedes the other address request, then either $\overline{EQT_R}$ or $\overline{EQT_R}$ would precede its counterpart. Let us assume that address requests to one of the sides, the right side, precedes the left side. In that event, $\overline{EQTR}$ precedes its counter-part on the left port. In that event, node $1_R$ would go high before node $1_L$ goes high.

Node IR going high would cause its output, the signal at node $2_R$ to go low. Since node $2_R$ is coupled to the input of the NAND gate $28_L$, node $2_R$ going low locks a subsequent signal at node $1_L$ from having any effect on the NAND gate $28_L$. Thus, the signal at node $2_L$ would remain at the $V_{CC}$ or high. Node $2_R$ would now be at ground potential or $V_{SS}$.

Initially, signals C and $\overline{C}$ are off so that the cross coupled nodes $2_L$ and $2_R$ have less loading and can therefore switch much faster. When the clock signals C and $\overline{C}$ are turned on, nodes $3_L$ and $3_R$ are driven by nodes $2_L$ and $2_R$ respectively. Nodes $3_L$ and $3_R$ are pre-charged high by the P channel transistors $38_L$ and $38_R$ respectively and gated by the signal $\overline{M}$. Thus, the signal at node 2R going low would cause the signal at node $3_R$ to discharge and go low, discharging through the transmission gate $30_R$.

The discharge of the signal at $3_R$ would be inverted by the inverter $34_R$. Thus, a high signal would appear at RWIN. Since node $3_L$ is at high, node $4_L$ would remain low. This low signal is supplied as LWIN.

From the nodes $4_L$ and $4_R$, the signals LWIN and RWIN, respectively, are supplied to NAND gates $80_L$ and $80_R$, respectively. A second input to the NAND gates $80_L$ and $80_R$ is the signal CONT, which is from the clock circuit shown in FIG. 5. From the NAND gates $80_L$ and $80_R$, the signals $\overline{BZ_R}$ and $\overline{BZ_L}$ are supplied to the busy steering circuits $82_L$, $BZST_L$ and $82_R$, $BZST_R$, which are shown in greater detail in FIG. 2b. The output of the BUSY steering circuits $82_L$ and $82_R$ is to supply the signal $\overline{iBUSY_R}$ and $iBUSY_L$ to buffers $84_L$ and $84_R$ respectively. The output of these buffer circuits $84_L$ and $84_R$ are the signals $\overline{BUSY_R}$ and $BUSY_L$, respectively.

When one of the $\overline{BUSY}$ signals (L or R) is enabled, data is prevented from being written into the unselected memory port, Thus, for example, the enablement of RWIN prevents data from the left port from being written into the memory if it was during a write cycle.

In FIG. 2b, there is shown the provision for the signal "master" and the signal "slave". The use of the signals "master" and "slave" is shown in FIG. 1b. As can be seen in FIG. 1b, two dual port memory circuit devices of the present invention are connected in tandem. The dual port addresses are connected to both of the memory circuit devices. However, one of the memory circuit devices arbitration circuit is the master and controls or arbitrates dual port address request to the second memory circuit device.

Since the clock signal C and $\overline{C}$ are both one shot signals, the signals at nodes $4_L$ and $4_R$ are latched through inverters $36_L$ and $36_R$ respectively to maintain their state. In addition, the nodes at $4_L$ and $4_R$ are cross-coupled through transistors $40_L$ and $40_R$ respectively to insure safety. Thus, when node $4_R$ goes high, transistor $40_L$ maintains node $4_L$ at low.

The foregoing description would just be reversed if $\overline{EQT_L}$ precedes the right side counter-part. This describes the normal state of operation for the two states of the output of the arbitration interrupt circuit 20. A timing diagram of these signals as described is shown in FIG. 3.

The meta-state is entered by one of two ways. Either the addresses $15_L$ and $15_R$ arrive simultaneously when both $\overline{CE_L}$ and $\overline{CE_R}$ are asserted or $\overline{CE_L}$ and $\overline{CE_R}$ are asserted simultaneously when both addresses $15_L$ and $15_R$ are already stable and equal. This causes the signals at nodes $1_L$ and $1_R$ to be simultaneously rising, i.e. going from low state to a high state. In this condition, the cross-coupled NAND gates $28_R$ and $28_L$ is unable to resolve the simultaneous requests. Thus, the signals at the nodes $2_L$ and $2_R$ would begin to fall at the same time. This meta-state or meta-stable condition for the cross-coupled NAND gates $28_R$ and $28_L$ being unable to resolve simultaneous and identical requests can last for several nanoseconds to tens of nanoseconds depending on the gain and size of the transistors used in the NAND gates $28_L$ and $28_R$. In this unstable or hung state, the low level on nodes $2_L$ and $2_R$ are detected by the inverters $50_L$ and $50_R$ and re-inverted by the inverters $52_L$ and $52_R$ and are present at the nodes $5_L$ and $5_R$.

The signals at the nodes $5_L$ and $5_R$ are supplied to an exclusive NOR gate 54 which is inverted by the inverter 56 and the output is present at node 6. The signal at node 6 is the exclusive OR of the signals present at the nodes $5_L$ and $5_R$. The signal at node 6 is low when the signals at the nodes $5_L$ and $5_R$ are identical and is high if the signals at nodes $5_L$ and $5_R$ are dissimilar. Thus, in the meta-state of the cross-coupled NAND gates $28_R$ and $28_L$, because the signals at nodes $5_L$ and $5_R$ are the same, a low signal would be present at node 6.

As shown in FIG. 5, the clock signal C and $\overline{C}$ are initiated when either side is enabled, i.e., when either node $1_L$ or $1_R$ is asserted high.

When the clock signals C and $\overline{C}$ are again supplied to the transmission gates $30_L$ and $30_R$, the clock signals are also supplied to the transmission gate 58. The low state of the signal at node 6 is then transmitted through the transmission gate 58 and is inverted by the inverter 60 and is present at node 7. The signal at node 7 is the signal T and is latched through the second inverter 62 to preserve its state when the clock signals C and $\overline{C}$ are no longer supplied to the transmission gate 58.

The signal T is supplied to the gate of transistor $32_L$ and the gate of transistor $42_R$. If T is driven high, it causes node $3_L$ to be discharged to ground, which breaks the meta-stable state. This causes the signal at $4_L$ to go high and causes the signal at $4_R$ to go low. In addition, signal T supplied to the transistor $42_R$ also helps the signal at the node $4_R$ to go down to ground.

Thus, T going high causes the signal on one side to be maintained and the other side to be dissipated. Further, as can be seen, if T is low, caused by node 6 being high, which is caused by an imbalance of the signals at nodes $5_L$ and $5_R$, the signal T supplied to transistor $32_L$ and $42_R$ has no effect on maintaining or dissipating the signals therein. Thus, the normal operation of the NAND gates $28_R$ and $28_L$ is not effected. The timing diagram of this scenario is shown in FIG. 4.

Referring to FIG. 5, there is shown a schematic circuit block diagram of the clock signals used in the circuit of the present invention.

The designation of the various signals shown in FIG. 5 have the following meanings:

| | |
|---|---|
| CONT | CONTention is high when both LEN and REN are asserted. CONT must be high to allow driving the appropriate external $\overline{BUSY}$ low. |
| POSSCONT | POSSible CONTention goes high when either LEN or REN goes high. POSSCONT starts the arbiter clock C with one-shot C1. This is in anticipation that a contention may occur. |
| $\overline{CONT}$ | This signal goes high when contention no longer exists, i.e., when either LEN or REN goes low then $\overline{CONT}$ goes high. This fires EMEMOS (End MEMory One Shot) which sets the M latch. |
| EMEMOS, $\overline{EMEMOS}$ | After the original contention goes away, these signals gate the transmission gate to sample POSSCONT and refire the clocks C, $\overline{C}$ via signal DEFBEG (DEFerred BEGin) and C2. This enables the arbiter to choose the port that originally lost in case the first port comes back and makes another request. This way the losing port's access is stacked and not lost. |
| $\overline{M}$ | $\overline{M}$ is active low at the end of a memory cycle. It goes to the gate of a P-channel precharge device to set nodes $3_L$ and $3_R$ high before the next clocked arbitration event (when C rises). This precharging resets both LWIN and RWIN low. |
| M | M goes active high at the end of a memory cycle and resets T low, as well as driving the input to $\overline{M}$. C1 or C2 will reset M, and $\overline{M}$ going high turns off the p-channel precharging of nodes $3_L$ and $3_R$, just before, C, $\overline{C}$ turn on the transmission gate. |
| RESET | When both LEN and REN are low, RESET goes high and POSSCONT goes low. RESET fires a one-shot called RESETOS. |
| RESETOS | This is a one-shot fired off of RESET. This is used to reset DEFBEG when EMEMOS does not fire which happens after one of LEN/REN has gone away and EMEMOS has already fired, then when the other of LEN/REN goes low, RESET rises. RESETOS goes up and down and node 90 is reset low back through the transmission gate TG2 and POSSCONT (which is low) and DEFBEG is reset low, which resets node 94 low and gets ready for another subsequent firing of C2. |
| C, $\overline{C}$ | These clocks gate the first stage of the arbiter. Either C1 or C2 will fire the clocks. Since C1 and C2 are both one-shot signals then C and $\overline{C}$ are also. |

Figure 6:
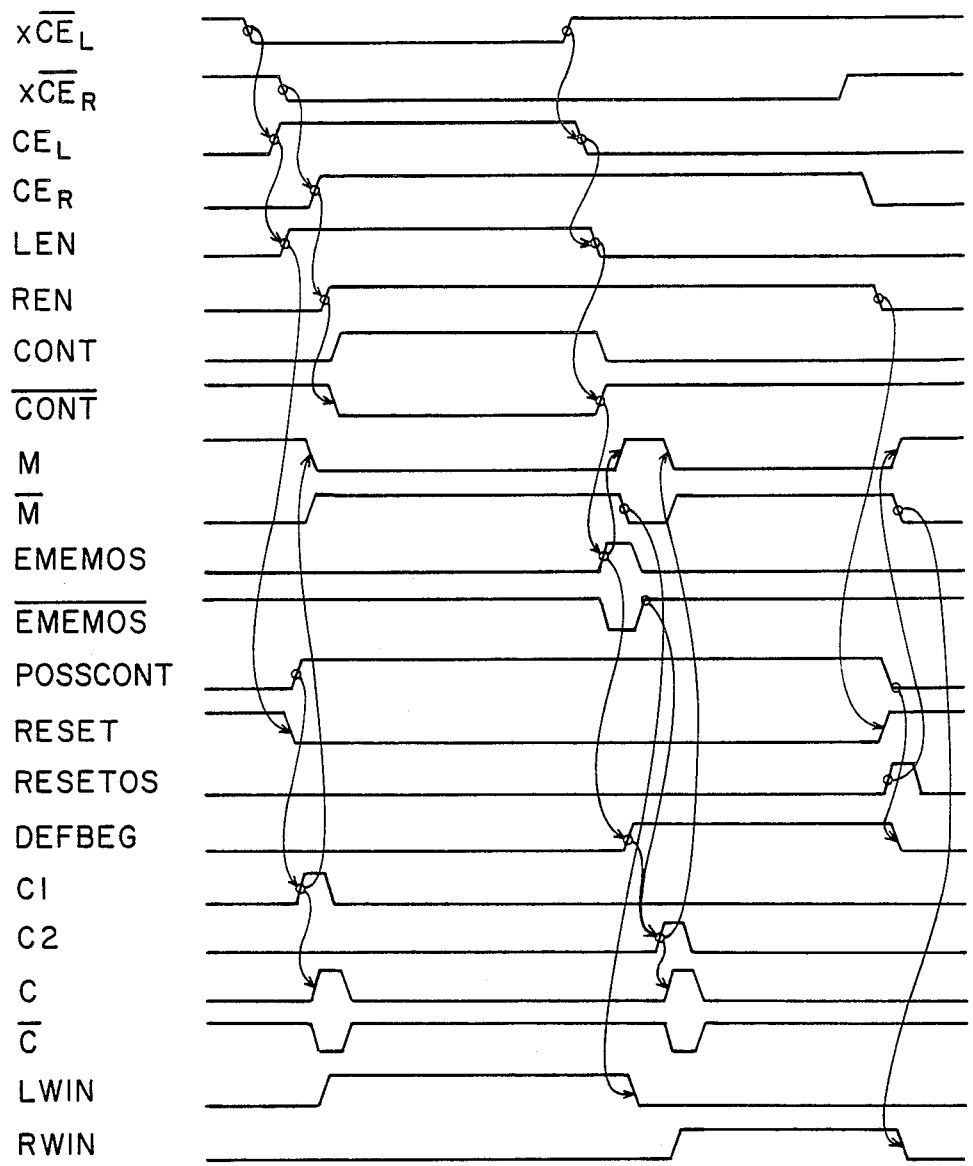
FIG. 6 are timing diagrams of various clock waveforms in the arbitration circuit means and clock circuit under one set of input waveforms.

When both ports try to access the same memory address the arbiter determines which side won. But the side that lost still needs to be serviced. A deferred cycle allowing access to the losing port must follow the original arbitrated cycle. The arbiter clocks provide a way to detect the end of the contention and reclock the arbiter to start a deferred cycle. This provides a way to prevent a cycle request from being ignored. FIG. 6 shows an example wherein the arbiter clock waveforms for a contention cycle is followed by the deferred cycle wherein the left port won. The waveform signals assume that the addresses latch and are stable.

The following describes the timing shown in FIG. 6. A contention is created when the addresses match and are not changing and also when both ports chip enables are active and not changing. For this example assume the addresses from both ports match and are stable. $CE_L$ and $CE_R$ are internal signals buffered and inverted from external chip enable signals $x\overline{CE}_L$ and $x\overline{CE}_R$, respectively. From FIG. 2 when $CE_L$ and $CE_R$ go high the signal LEN and signal REN go high. LEN going high causes signal RESET to go low and POSSCONT which stands for possible contention to go high. POSSCONT is the input to a one-shot circuit which generates C1. C1 goes to an N-channel pull down device to reset M low as well as going into an "OR" circuit (made of a NOR gate followed by an inverter) to produce clock signals C and $\overline{C}$ which are also one-shots. In this example LEN came before REN so LWIN goes high while RWIN stays low.

The right side would have just as easily been the winner is $x\overline{CE}_R$ had gone low before $x\overline{CE}_L$ went low.

The contention is removed when $x\overline{CE}_L$ (in this example goes back high causing $CE_L$ to go low and this causes LEN to go low. LEN going low causes $\overline{CONT}$ to go high and CONT to go low. (An address change would also remove the contention by causing Match to go low and both LEN and REN would go low.) When $\overline{CONT}$ goes high it fires a one-shot signal called EMEMOS and its inverse $\overline{EMEMOS}$. The rising edge of EMEMOS causes M to go high and $\overline{M}$ to go low. $\overline{M}$ is the precharge signal in the arbiter which charges up node $3_L$ (or $3_R$) which resets LWIN (or RWIN) back low.

When EMEMOS goes high it turns on a transmission gate and signal POSSCONT which is high feeds through the transmission gate to charge up node 90 and then through two inverters asserts DEFBEG (DEFerred BEGin). DEFBEG has gone high while EMEMOS was low. When EMEMOS then goes back high the 2 input "AND" gate (made of NAND plus inverter) node 94 is driven high and this fires one-shot C2. C2 in turn goes through the "OR" gate to refire C and $\overline{C}$. The circuit made of the transmission gate TG1 and latch, DEFBEG, and the C2 one-shot all work together to refire the arbiter clocks C and $\overline{C}$ if one of LEN or REN were still high when the other one of LEN or REN goes low. Without this the deferred cycle would not be fired and the port that lost the contention would not have its memory access performed.

All this time REN is still high and the arbiter has been precharged. So when C and $\overline{C}$ are asserted the arbiter is refired. This time REN is high and LEN is low so that right side wins and RWIN goes high. This is the deferred cycle. Nothing else happens until the external chip enable $\overline{XCE}_R$ goes back high. This ends the deferred cycle by causing $CE_R$ and REN to go low.

When REN goes low, both inputs to the RESET "NOR" are low so RESET goes high and fires the reset one shot RESETOS. Also RESET going high causes POSSCONT to go back low. POSSCONT being low and RESETOS being high discharges node 90 through the second transmission gate TG2. This node 90 going low causes DEFBEG to go back low, which in turn resets node 94 back low.

RESETOS is also fed into an N channel transistor which is used to reset the M latch and M back high and $\overline{M}$ back low.

Now all the signals are back to where we started and the cycles have completed.

The method and apparatus of the present invention can also be used to apply to arbitration interrupt circuits where there is a selected-unselected relationship or where there is an input imbalance of the cross-coupled flip-flop. In both of these cases, a meta-stable condition can still exist when the timing is skewed by an amount equal to the selected-unselected delay or the imbalance. Thus, the possibility of an unresolved arbitration event within a fixed time period is still possible for these non-simultaneous identical address requests.

It should be noted that there are many advantages to the method and apparatus of the present invention. Notably, the internal nodes of the arbitration interrupt circuit 20 is detected to note when the arbitration interrupt circuit has failed to resolve itself within a fixed time period. The detection of the meta-stable condition is noted and the circuit causes one of the sides to be favored. Further, this occurs within a fixed time period, i.e. prior to the next memory cycle and within the intervals of clock cycles.

What is claimed is:

1. In a dual port circuit device having a first address port for receiving a first address signal and a second port for receiving a second address signal and an arbitration circuit means for arbitrating identical address requests to said first port and said second port, said arbitration circuit means for receiving said first and second address signals and having a first and second signal paths and being capable of being in a first state wherein said identical address requests is resolved by favoring said first address port and generating a first signal on said first signal path and a second signal complementary to said first signal on said second signal path; a second state wherein said identical address requests is resolved by favoring said second address port and generating a second signal on said second signal path and a first signal complementary to said second signal on said first signal path; and a meta-state wherein said arbitration circuit means is unable to resolve said identical address requests by generating non-complementary signals on said first and second signal paths in a fixed time; wherein the improvement comprising:
means connected to said first and second signal paths for detecting said noncomplementary signals and for generating an output signal in response thereto; and
means for forcing said arbitration circuit means into said first state by generating said first signal on said first signal path and a second signal complementary to said first signal on said second signal path in response to said output signal.

2. The circuit of claim 1 wherein said detecting means further comprises:
an exclusive OR circuit means connected to said first and said second signal paths for generating said output signal which is the logical exclusive OR of signals on said first and said second signal paths.

3. The circuit of claim 2 wherein said forcing means further comprises:
means for receiving said output signal and for causing said first signal to be maintained and for causing said second signal to be dissipated.

4. The circuit of claim 3 wherein said arbitration circuit means generates said first signal on said first signal path and said second signal complementary to said first signal on said second signal path in the event the first address signal to said first address port match but precede the second address signal to said second address port.

5. The circuit of claim 4 wherein said arbitration circuit means generates said second signal of said second signal path and said first signal complementary to said second signal on said first signal path in the event the second address signal to said second address port match but precede the first address signal to said first address port.

6. The circuit of claim 5 wherein said exclusive OR circuit means comprises a logic exclusive NOR circuit with an inverter.

7. The circuit of claim 6 wherein said arbitration circuit means comprises two cross-coupled NAND gates.

8. The circuit of claim 5 wherein said memory circuit is a dual port SRAM.

9. The circuit of claim 1 wherein said forcing means further comprising;
means for generating a second signal on said second signal path and a first signal complementary to said second signal on said first signal path after said arbitration circuit means completes address request to the first address port.

10. A method of resolving identical address requests in a cycle in a dual port circuit device having a first address port for receiving a first address and a second port for receiving a second address and an arbitration circuit means for arbitrating identical address requests to said first port and said second port, said arbitration circuit means having a first state wherein said identical address requests is resolved in said cycle by permitting address request to said first address port and denying writing of data to said second address port; a second state wherein said identical address requests is resolved in said cycle by permitting address request to said second address port and denying writing of data to said first address port; and a meta-state wherein said arbitration circuit means is unable to resolve said identical address requests in said cycle; wherein the improvement comprising:
detecting said arbitration circuit means in said meta-state during said cycle; and
forcing said arbitration circuit means into said first state during said cycle, in response to the detection of said meta-state.

11. The method of claim 10 further comprising:
forcing said arbitration circuit means into said second state, upon completion of address request to said first address port in said first state.

* * * * *